United States Patent [19]

Trost

[11] Patent Number: 5,008,019

[45] Date of Patent: Apr. 16, 1991

[54] DECONTAMINATION OF EARTH FORMATIONS

[75] Inventor: Paul B. Trost, Golden, Colo.

[73] Assignee: Waste-Tech Services, Inc., Golden, Colo.

[21] Appl. No.: 351,463

[22] Filed: May 15, 1989

[51] Int. Cl.⁵ .............................................. B01D 12/00
[52] U.S. Cl. ..................................... 210/747; 210/756; 210/901; 210/908; 166/252; 166/270; 166/275; 252/8.552; 252/8.554; 405/263; 405/264
[58] Field of Search ............... 210/747, 730, 756, 725, 210/728, 901, 908, 925; 166/252, 270, 275; 405/129, 263, 264; 252/8.552, 8.554

[56] References Cited

U.S. PATENT DOCUMENTS

| | | | |
|---|---|---|---|
| 3,482,636 | 12/1969 | Crowe | 166/312 |
| 3,782,471 | 1/1974 | Felmann et al. | 252/8.552 |
| 4,074,759 | 2/1978 | Bousaid | 166/273 |
| 4,206,809 | 6/1980 | Jones | 166/252 |
| 4,502,541 | 3/1985 | Lawson et al. | 166/270 |
| 4,591,443 | 5/1986 | Brown et al. | 210/752 |
| 4,822,512 | 4/1989 | Auchincloss | 252/187.21 |

OTHER PUBLICATIONS

U.S. Statutory Invention Registration H475, Lawson et al., 6/88.

*Primary Examiner*—Peter Hruskoci
*Assistant Examiner*—Krisanne Shideler
*Attorney, Agent, or Firm*—Joseph C. Herring

[57] ABSTRACT

Water supply contamination is reduced within a formation or eliminated in a flooding procedure utilizing an alkaline aqueous solution. Biodegradable polymer provides a desired viscosity and mobility. Biodegradable surfactant and alkali provide any needed interfacial tension reduction. Additives, e.g., chelating agents, can be utilized for solubilization of insoluble contaminants.

2 Claims, No Drawings

DECONTAMINATION OF EARTH FORMATIONS

BACKGROUND OF THE INVENTION

There are many facets to treatment of contaminated soils and aquifers to remove contaminants and many authors and laboratories have worked toward discovery of successful processes for doing so. The books *Groundwater Decontamination from Hazardous Wastes*, Princeton University Water Resources Program, Prentice-Hall, Inc., 1984, and *Aquifer Restoration*, R. C. Knox et al, National, Center for Ground Water Research, Noyes Publications, 1986, and references cited within these books attest to this fact.

This invention overcomes many of the problems faced in decontaminating soils and aquifers contaminated with either or both organic and inorganic contaminants by introducing into the reservoir an aqueous alkaline solution of polymer, surfactants, and additives where appropriate. The primary purpose behind the use of the polymer is to provide mobility control so that the injected solution does not finger through the contaminant or does not bypass zones of low permeability in favor of passage through zones of higher permeability. One or all of the alkaline agent(s) and additive(s) can interreact with the contaminant(s) to effectively remove them from the formation rock so that they can be displaced in the produced water. A major benefit is the substantial reduction in cost when compared with the micellar and other surfactant system flooding processes.

SUMMARY OF THE INVENTION

The process of this invention utilizes flooding with alkaline solutions of biodegradable polymer through various injection facilities into a contaminated formation to divert, and/or remove contaminants. Produced water is recovered through production facilities.

The formations are treated by:

A. Determining the suitability of the contaminated zone for treatment by evaluating the contaminated zone and contamination source to determine the characteristics of the reservoir and contaminants and to determine the extent and configuration of the contamination;

B. Designing an optimum decontamination/solution pattern for injection and the facilities suitable for decontamination of the contaminated formation; and C. Injecting the treatment solution into the formation under conditions which will contain, divert and/or remove the contaminant. The solution is displaced outwardly from the injection facilities until it is positioned to accomplish and/or has accomplished the desired containment, diversion or contamination removal.

GENERAL DESCRIPTION OF THE INVENTION

For ease of discussion, the contaminated earth, aquifer and nearby earth are collectively termed "formation". Thus, where the water flow from a contamination source is into an aquifer and/or surrounding soil which it contaminates, the two, which can be spatially separated, are termed a "formation". The terms "remove", "react with", and "divert" are collectively included within the term "decontamination". The term "contamination source" is any soil, whether aquifer or not, from which contaminants flow into an aquifer. The contamination source can be a spill zone, landfill, the earth surrounding a leaking tank of hydrocarbon, e.g., gasoline, haloalkane, e.g., trichloroethane, and viscous fluids such as creosote, hydraulic oils or other fluids.

The decontamination treatment fluids are made up of water, alkaline agent and polymer. Surfactants, and, in some cases, other additives can also be utilized. The water can be from any source but is preferably pretreated water from the formation to be decontaminated. The surfactant, alkaline agent, polymer, etc. solution must be formulated for use in a particular decontamination treatment with the pH of the flooding fluids within the zone to be flooded in mind because the effectiveness of particular polymers, surfactant, chelating agents, etc. can change with change in pH.

The preferred flooding material pH range, for most formations, is from about 8 to about 11. Preferably, the desired pH is from about 9 to about 10.5. The chemical formulation is frequently buffered. The pH of the aqueous alkaline flooding material will depend, in part, on the polymer utilized. If surfactant and/or other additives are used, they too will affect and can be affected by the preferred injection fluid pH.

The aqueous polymer solution (suspension) elected for a particular formation restoration will be designed to reduce or eliminate the permeability within the formation, increase the viscosity of the injected fluid, react with contaminant(s) and/or to carry any additives needed for decontamination.

The polymer used to make up the solutions will vary in composition depending upon its intended purpose. A biodegradable polymer which can be utilized in short term, high flow rate treatments is preferred. If the polymer must remain in the reservoir for containment or diversion purposes for a longer period of time, the biodegradation of the polymer must be delayed or eliminated. Polymers which are less biodegradable, or which can react with the ions in the formation to free contaminants which strongly adhere to the rock or to become substantially nonbiodegradable and water insoluble are also useful.

For decontamination, suitable polymers include the polyacrylamides, polyacrylates, N-sulfohydrocarbon acrylamides, carboxy and hydroxyalkyl celluloses, polysaccharides, and other polymers which can be removed from the effluent stream by precipitation, plugging, chemical breakdown or biodegradation. The polymers may be made up of a single species and average molecular weight or multiple species and molecular weights. Preferred biodegradable polymers are polysaccharides and carboxy and hydroxy lower alkyl celluloses. Preferred nonbiodegradable polymers are polysaccharides and polyacrylamides.

Typical patents teaching these polymers and their uses include U.S. Pat. No. 3,858,653, issued to J. S. Rhudy et al; U.S. Pat. No. 3,873,923 issued to B. L. Knight et al; and U.S. Pat. No. 4,011,910 issued to J. S. Rhudy et al. On completion of the cleanup, the polymer can be broken down and removed, if necessary, i.e., by use of peroxides, as described in U.S. Pat. No. 3,873,923 (Knight et al). the polysaccharides used in oil recovery flooding operations are preferred for most purposes.

Many biodegradable surfactants have been utilized in various oil recovery processes and many of these surfactants can be utilized in the process of this invention. The preferred surfactants are those anionic and nonionic surfactants whose water or oil solubility has been tailored for the requirements of the flooding operation.

Additives may be salts or organic and inorganic compounds necessary to stabilize the formation in the presence of the polymer, to increase mobility control or plugging, to catalyze reaction of one or more of the system components with contaminant(s), to react with contaminant(s), to chelate insoluble metals, and/or to control pH for maximum contaminant removal. pH control is obtained with water soluble bases and buffers, i.e., hydroxide, silicates, carbonates and bicarbonates of sodium and potassium. The preferred chelating agents are basic and are those preferred by some in the water treatment industry, e.g., alkali metal citrates and acetates and EDTA are preferred chelating agents for use in the process.

The alkaline agents are used primarily to reduce the interfacial tension between the water and the contaminant, thereby releasing the contaminant from the formation. Ammonia can be used to control pH but due to its gaseous nature, it cannot be used in many surface soil cleanup operations.

Additive(s) can be injected as a preslug to free or assist in freeing organic contaminant adsorbed on the mineral grains of formation rock or blocked in its pores. U.S. Pat. No. 3,888,308 issued to W. W. Gale et al and U.S. Pat. No. 3,888,309 issued to J. S. Rhudy et al are exemplary teachings of the use of additives with polymer systems.

A typical aqueous polymer solution has the following make-up: 0.1–1.0 wt. % sodium silicate; 0.2–1.0 wt % sodium carbonate; 0.2–1.5 wt % sodium bicarbonate; 0.02–0.3 wt % xanthan gum polymer and biocide as required. This formulation produces a flooding solution with a pH of 9.5–11.0. A typical formulation utilizing a surfactant has the following make-up: 0.2–1.5 wt % sodium carbonate; 0.05–1 wt % ethoxylated nonylphenol; 0.02–0.3 wt % xanthan gum polymer and biocide as required. This formulation produces a flooding solution with a pH of 10–11.5.

THE DECONTAMINATION PROCESS

The first step in the process of this invention is to evaluate the formation and the contamination. This step utilizes well known technology and the evaluation may even be done on the basis of available data. The second step is to prepare treatment solutions. Chapter V of the Knox et al reference specifically addresses various above-ground treatments for groundwater. Procedures for selecting polymers and their use as plugging or mobility control agents are also well known in the oil industry and are addressed in S. D. Jones (U.S. Pat. No. 4,206,809) and the Rhudy et al and Knight et al references cited above. Additive selection processes would be a mixture of techniques used by both the water treatment and oil industries.

The materials selected can be formed into "slugs" which are then used to flood cores or packs which are representative of the contaminated formation and which contain water representative of that in the formation. The actual interaction between the various species of the solution and the formation and its components will sometimes differ significantly from that expected. The techniques for formation evaluation are well known and are conducted by independent core laboratories as well as hydrologic and oil recovery laboratories.

The compositions of one or more of the suite of injection treatment solutions may be found to be substantially optimum for the projected flooding operation. Sometimes, however, the core and/or pack flooding will indicate that additional treatment solutions should be formulated and tested.

In parallel with the selection of flooding solutions, the flooding pattern and facilities are designed, taking into account the three dimensional characteristics of the contaminated zone(s). The injection facilities are set up with both a desired well pattern and vertical injection controls where necessary.

After completion of the testing, injection facilities are in place, and selection of the appropriate treatment solutions, slug injection is initiated. The injection process and solution composition(s) are designed for containment, diversion, or contaminant removal as needed.

The following examples more fully illustrate the invention:

EXAMPLE 1

The site for this field decontamination consists of a sandy soil over a solution cavity limestone. The boundary between the sand and limestone is quite variable between two feet and eight feet below the surface. The site was contaminated with viscous (130 cps) oil which floated on the shallow aquifer at seven feet. The hydraulic conductivity of this matrix was measured to be in excess of 1000 ft/day by means of an injectivity test. Porosity was estimated to be 30–35%.

A pilot test was completed with four production wells, one drilled at each corner of a 10 feet square. The wells were drilled to 11 feet and cased with PVC pipe. The slotted interval was from the water table at seven feet to the bottom of the casing. Each well was fitted with a pump capable of lifting between 0.5 and 5.0 gallons/minute.

The slug injection was accomplished through a perforated horizontal pipe which was buried in a gravel-packed trench. The perforated section, which was 10 feet long, bisected the pilot area. The injection lateral was four feet below the ground surface (three feet above the water table).

The injection slug formula was:
(a) 0.5 wt % sodium silicate
(b) 0.5 wt % sodium carbonate
(c) 1.1 wt % sodium bicarbonate
(d) 0.15 wt % xanthan gum polymer
(e) 0.01 wt % Chloramine T monochloroamine, a (biocide additive)

and was blended using treated groundwater. After addition of the polymer, the slug was circulated through a high-shear mixer until filterability of the slug was acceptable. This slug had a viscosity of about 50 cps. The first batch of slug, which was equivalent to two pore volumes of the pilot area, was heated to 130° F. before percolating through the soil at 8 gallons/minute. The second batch of slug, which was also equal to two pore volumes, was injected without heating and had a higher viscosity.

The produced fluid consisted of a small volume of free oil followed by an emulsion containing between 0.1 and 2.0 wt % oil. This emulsion was treated and flocculated, yielding a small sludge phase for dewatering and disposal as well as the treated water which could be recycled or discharged.

EXAMPLE 2

An injectivity test was conducted at a site with alluvial soil and a water table which varied between two feet and six feet below the surface. This site contained numerous organic chemicals used in wood-treating processes. Some of these chemicals floated on the water table while others were dense enough to sink below the water to an impermeable barrier layer.

Injection was by gravity feed to a horizontal pipe. The perforated section was 10 feet long and was packed in a gravel bed 10 feet below surface. Fluid levels in numerous piezometers in the injection trench were monitored to ascertain the effect of slug viscosity and injection rate on the fluid level profile.

The injection slug formula was:
(a) 1.5 wt % sodium carbonate
(b) 1.0 wt % ethoxylated nonylphenol
(c) 0.15 wt % xanthan gum polymer and
(d) 0.02 wt % sodium hypochlorite and was blended using city water which had been softened. The mixing and shearing procedure to prepare the slug for injection was similar to the technique described for the first example. Slug viscosity was 55 cps. Based on injection rates, the permeability of the soil in the vicinity of the trench was between 10 and 40 darcies. Approximately 20,000 gallons of water and 7,000 gallons of slug were injected into the trench over a several week period.

EXAMPLE 3

The process of Example 1 is carried out in a flowing aquifer under conditions similar to that of the contamination zone of Example 1. The viscosity of the injected fluid of Example 1, however, is 100 cp. and the slug is injected in a configuration which diverts the aquifer flow from a potable water well downstream.

From the above description, one skilled in the art will, like an architect building a home, be able to select from the available testing protocols and materials and effectively conduct the processes of this invention.

The examples are not intended to be limiting but merely illustrative of the mechanisms and materials pertaining to the invention.

Now having described the invention, what I claim is:

1. A decontamination process consisting essentially of displacing through a formation contaminated with organic materials fluids including amounts of an aqueous alkaline polymer solution comprising solutions selected from the group consisting of (a) sodium silicate, sodium carbonate, sodium bicarbonate, xanthan gum polymer and monochloroamine, (b) sodium carbonate, ethoxylated nonylphenol, xanthan gum polymer and sodium hypochlorite, and (c) mixtures of the components of (a) and (b); sufficient to substantially decontaminate the formation and recovering the displaced fluids.

2. In a process for treating a reservoir contaminated with organic materials, the steps comprising
   (a) evaluating the contaminated zone and contamination source to determine the characteristics of the reservoir and contaminants and the volume of the contamination to determine the suitability of the contaminated zone for treatment;
   (b) formulating an aqueous polymer solution comprising solutions selected from the group consisting of
      (1) sodium silicate, sodium carbonate, sodium bicarbonate, xanthan gum polymer and monochloroamine;
      (2) sodium carbonate, ethoxylated nonylphenol, xanthan gum polymer and sodium hypochlorite having a pH within the range of about 8 to about 11; and
      (3) mixtures of components of (1) and (2)
   (c) injecting the aqueous polymer solution to displace at least one contaminant from within a previously determined contamination zone, to divert the flow of contaminant from its normal flow path within the contamination zone, and to remove contaminants from the contamination zone.

* * * * *